Aug. 31, 1937.  J. M. RUMPLE  2,091,937
TREATMENT OF ACID SLUDGE
Filed Dec. 6 1933
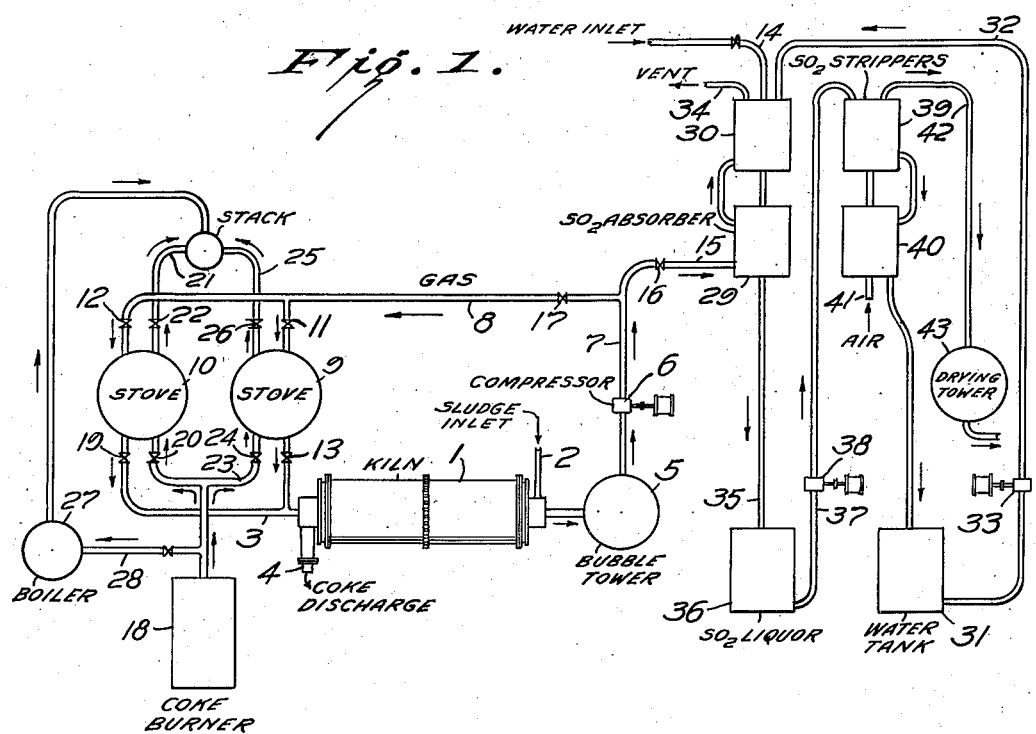
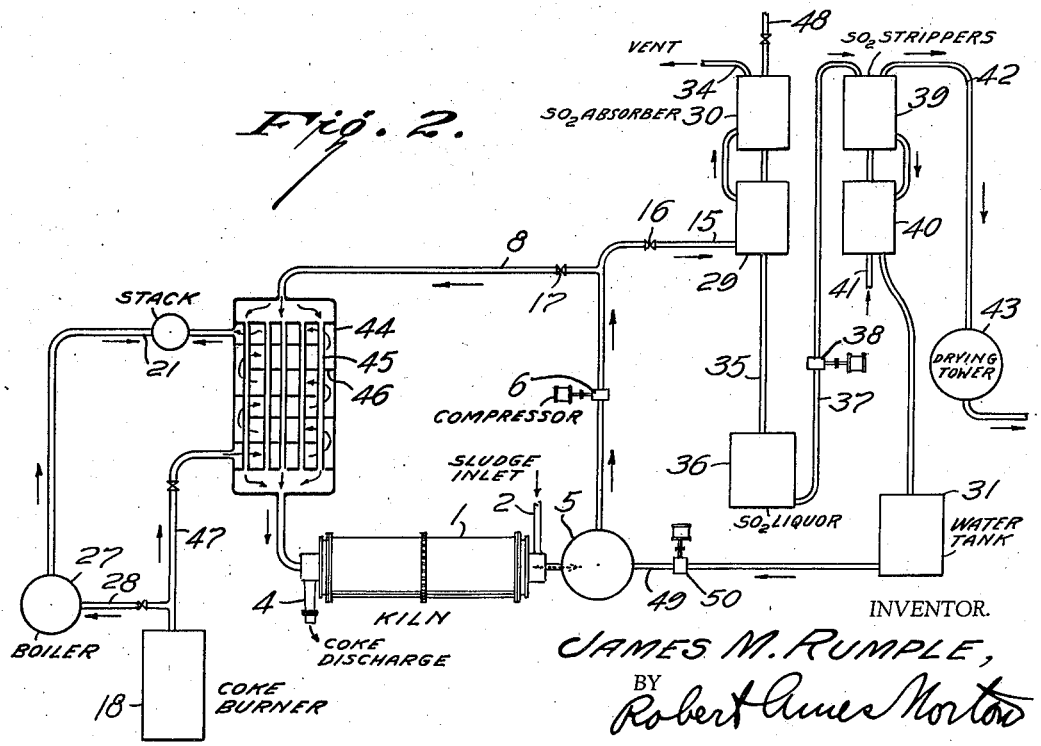
INVENTOR.
JAMES M. RUMPLE,
BY Robert Ames Norton
ATTORNEY.

Patented Aug. 31, 1937

2,091,937

UNITED STATES PATENT OFFICE 2,091,937

TREATMENT OF ACID SLUDGE

James M. Rumple, St. Louis, Mo., assignor to Chemical Construction Corporation, New York, N. Y., a corporation of Delaware Application December 6, 1933, Serial No. 701,137

11 Claims. (Cl. 23—177)

This invention relates to the production of an $SO_2$ containing gas from the acid sludge obtained as a by-product from the purification of carbonaceous material with sulphuric acid, and more particularly it relates to the production of gas containing $SO_2$ from the acid sludge from the sulphuric acid purification of petroleum fractions.

The thermal decomposition of acid sludges to produce $SO_2$ was not commercially successful until 1931 when the Hechenbleikner process, described in the copending application Serial No. 568,050, was filed October 10, 1931, now Patent No. 1,953,225, dated April 3, 1934. This process heated acid sludge with combustion gases in a rotary kiln and very satisfactory results were produced with acid sludges of high acid content. It was possible to obtain a gas containing very satisfactory proportions of $SO_2$ for use in the contact sulphuric acid process, but considerable difficulties were encountered with the removal of hydrocarbons from the gas and the process did not prove as well suited for high oil or low acid sludges as for the high acid sludges. Various modifications of the Hechenbleikner process have been developed to avoid difficulties encountered by the presence of hydrocarbons in the gas. Thus, for example, in the copending application of Hechenbleikner and Mast, Serial No. 693,136, filed October 11, 1933, the uncondensable hydrocarbons are burned out in the hydrocarbon combustion furnace. This method, which is entirely satisfactory with high acid sludges, however, cannot be employed with sludges which contain excessive quantities of oil as the amount of hydrocarbons which would have to be burned is too great and the dilution with carbon dioxide and nitrogen by the combustion process renders the final gas too dilute for satisfactory operation in the contact sulphuric acid process. Even with high acid sludges the Hechenbleikner process requires considerable equipment for purification of the gas and is suitable primarily where a gas of moderate or low $SO_2$ content is desired for it is, of course, impossible with the straight Hechenbleikner process to produce from the kiln a gas having very high concentrations of $SO_2$ since the gas is necessarily diluted with the relatively quite large volumes of combustion gases employed in heating the sludge.

While the production of a strong $SO_2$ gas from acid sludge is of particular importance when the gas is to be utilized in the contact sulfuric acid process, this is not the only process in which a strong $SO_2$ gas is desirable. Thus, for example, when an $SO_2$ gas contains hydrocarbons it should be treated to remove the hydrocarbons before using in the chamber process for sulfuric acid because of the loss of nitric oxides which otherwise results. Many other uses for $SO_2$ such as, for example, the production of liquid $SO_2$ by condensation requiring relatively strong gas for good efficiency and the strong $SO_2$ gas produced by the present invention opens up such fields to $SO_2$ gases from acid sludge. Even in processes where a strong gas is not essential such as, for example, in the production of bisulfites, the stronger the gas the greater the capacity of given apparatus. The present invention is therefore not limited to processes which cannot be carried out with a dilute impure $SO_2$ but also includes processes which can utilize a dilute $SO_2$ but in which the stronger gas of the present invention makes for better economy.

The present process produces an $SO_2$ gas of great strength in some cases up to 80 or 90% of $SO_2$ and can be used with equal efficiency on high oil or low oil sludges or in fact on sludges of any type. Essentially the present invention differs from the Hechenbleikner process in that instead of using combustion gases as a source of heat to decompose the sludge in the kiln, the stream of gaseous products from the kiln is treated to separate water and condensable hydrocarbons and then is recirculated through the kiln, after being heated up in suitable stoves or heat exchangers. In this manner since the $SO_2$ gas is used as the heating agent a high percentage of $SO_2$ rapidly builds up and a portion, of course, is continuously removed from the circuit. This process permits operating with sludges of almost any type since even when the amount of hydrocarbons is very high, by far the major portion of the hydrocarbons volatilized can be condensed which is impossible with the ordinary Hechenbleikner process owing to the heavy dilution with combustion gases which results in the formation of hydrocarbon mist which cannot be adequately removed in condensers of reasonable size. The present process having no large volume of dilution gases and correspondingly a relatively very slow circulation speed, can be freed from practically all condensable hydrocarbons in a very simple manner so that it is practically immaterial to the satisfactory operation of the process whether the sludge used contains small or large amounts of volatilizable hydrocarbon material, whereas in the straight Hechenbleikner process the presence of large amounts of hydrocarbons very seriously interferes with the operation and requires elaborate equipment for handling it.

While the present invention is in no sense limited to the treatment of high oil sludges, it being advantageous even with high acid sludges which can be satisfactorily treated by the Hechenbleikner process, in its preferred embodiment it is particularly adaptable for use with such high oil sludges which are difficult to handle by other processes.

The production of a very strong $SO_2$ gas opens up further advantages for the present process. Thus, for example, if the $SO_2$ is to be reduced to sulphur, as described and claimed in the co-pending application of C. B. Clark, Serial No. 675,973, filed June 15, 1933, the present process is particularly useful because the success of sulphur processes depends to a considerable extent on the concentration of $SO_2$ gases available because the cost of final recovery of sulphur becomes prohibitive where the gases are too dilute.

While the strong $SO_2$ gas can be purified and the small amount of residual hydrocarbons removed by the same methods as are used in the Hechenbleikner process or in some cases the amounts of hydrocarbons are small enough so that they do not cause difficulty in water formation in the contact sulphuric acid process, as described and claimed in the co-pending application of C. B. Clark, filed May 9, 1933, Serial No. 670,123, now Patent No. 2,019,893, dated November 5, 1935, the strong gases of the present invention lend themselves to a different method of purification which produces highly purified $SO_2$ gases. This method consists in absorbing the crude $SO_2$ in water and driving out pure $SO_2$ therefrom by means of hot air so that a gas is produced suitable for the contact sulphuric acid process. It should be understood that I do not claim as my invention this method of stripping per se which forms the subject of the copending application of W. L. Spalding, Serial No. 709,558, filed February 3, 1934. In the present application this method of purifying $SO_2$ is claimed only in conjunction with the sludge decomposition system forming the main features of the present invention, but in a more specific aspect this method of purification is covered in conjunction with the present process since it provides adequate purification with very simple equipment and results in a gas of most favorable composition for the contact sulphuric acid process or for other uses requiring strong $SO_2$ gases.

The strong gas of the present invention may be used in a contact sulphuric acid process entirely apart from other sources of $SO_2$ or it may be combined with $SO_2$ from a Hechenbleikner process where the combination will result in a sufficient dilution of the hydrocarbons remaining in the gas from the Hechenbleikner process to render their removal by the Hechenbleikner and Mast process unnecessary. This combination is not claimed in the present invention broadly but forms the subject matter of the copending application of C. B. Clark, Serial No. 671,647, filed May 18, 1933, now Patent No. 2,044,419, dated June 16, 1936. Such a combined process is of importance where a relatively large volume of high oil sludges are encountered together with some high acid sludges and particularly where a Hechenbleikner plant is already in operation and it is desired to add to it units capable of handling sludges which are higher in oil.

The present process possesses the advantages of the Hechenbleikner process with regard to the production of a useful fuel from the sludge. This coke may be sold or it may be used as part of the fuel for heating the circulating gases of the present process. It is an advantage of the present process that the design of heater or stove for the circulating gases can be of any suitable type and can readily be adapted to heating by solid fuel, whereas for compact units of the Hechenbleikner process, in which combustion gases from a furnace are sent through the kiln, it is normally preferable to use a liquid fuel. The complete independence of the present process in the matter of fuel characteristics is an important advantage where the oil refinery may be so situated as to have no market for the coke produced.

The present invention is not dependent on any particular mechanical design of apparatus. The drawing, which is for the most part diagrammatic in form, merely shows typical arrangements, but the process can be used in other mechanical arrangements and it is an advantage of the present invention that it is very flexible and adaptable to the most varied types of installations and operating conditions.

In the drawing Figure 1 is a diagrammatic elevation of a plant using stoves as a heating means; and Figure 2 is a diagrammatic elevation with the heat exchanger in section of a plant utilizing a continuous heat exchanger for heating the gas stream.

In the design shown in Fig. 1 the sludge is caused to flow from the sludge inlet 2 through the kiln 1 where it encounters a countercurrent flow of heating gases from the pipe 3. The sludge is decomposed in zones as described in the Hechenbleikner patent above referred to and a coke is discharged at the opposite end of the kiln through the coke discharge 4. In order that the operation of the kiln may be better understood the following description thereof, taken from the Hechenbleikner patent, is presented:

The gases may be introduced into the retort at a temperature of about 1600° F., and the flow of the feed sludge as well as the sludge body may be so controlled (along with the control of the gas flow) as to create three zones of reaction, one for the evaporation of water and any light distillates, another for effecting the main reaction of the sludge to reduce the sulphuric acid and sulphate compounds therein to $SO_2$, and a third zone for the final disintegration of the sludge residue and the removal therefrom of any occluded and/or residual gases. In zone I the temperature range may be, for example when treating a blended liquid sludge, from 212° to 300° F.; in zone II this temperature range may be, for example, from 400° to 420° F.; these temperatures being those to which the sludge and sludge residue are heated by the hot gases.

The main reaction of the organic matter of the sludge, the combustion gases and the sulphuric acid content of or compounds in the sludge takes place in and around the second reaction zone, although the evolution of $SO_2$ begins at the lower temperatures, the evolution taking place, however, with increasing power until the critical temperature range such as of the order of 380° to 420° F. in the aforementioned example is reached. The direct heating of the sludge body while the latter is in an agitated and broken up state accomplishes a uniform heat treatment and avoids local overheating with its consequent disadvantages in producing side reactions. I have found that with the reacting conditions in the retort, all of the reactable sulphur and $H_2SO_4$ content and compounds in the sludge are converted and reduced to $SO_2$ gas, there being no $SO_3$ gas or sulphuric acid mist in the exit gases.

Continuing the description of Fig. 1, the gases from the retort or kiln 1 as obtained according to the above described operation and containing $SO_2$, water vapor, hydrocarbons and minor proportions of other gases, pass into a bubble tower or condenser 5 where water is condensed together with condensable hydrocarbons. The hydrocarbons may be separated from the water and drawn off in the customary manner (not shown) and if desired the bubble tower may be in duplicate with the gases passing through in series as shown in the Hechenbleikner and Mast application above referred to.

The purified gas containing $SO_2$, small amounts of water vapor and very small amounts of hydrocarbons is driven by the blower 6 through the pipes 7 and 8 into one or other of the heating stoves 9 and 10. The flow into the stoves is through the short pipes with the valves 11 and 12, respectively. From the stoves the heated gas passes through the short pipes provided with valves 13 and 19 into pipe 3 and recirculates through the kiln. A portion of the gas stream is drawn off through the pipe 15 provided with the valve 16 and the proportion drawn off is determined by the setting of the valve 16 and the valve 17 in the pipe 8. While the gases are passing through one stove, for example 9, the valves 12 and 19 are closed and hot gases from a coke burner 18 are passed into stove 10 through a pipe controlled by the valve 20 and out, to a stack through the pipe 21 controlled by the valve 22. The coke burner is connected to the stove 9 through the pipe 23 controlled by the valve 24, which is, of course, shut at this time, exit to the stack being through the pipe 25 controlled by the valve 26 which is likewise closed. As the amount of heat from burning the coke is normally in excess of that required for the reaction, a portion may be by-passed to the boiler 27 through the valved pipe 28 and the heat utilized in the form of steam. When stove 9 has cooled down and stove 10 has heated up, valves 11, 13, 20 and 22 are closed and valves 12, 19, 24 and 26 are opened, the gas then flowing through the hot stove 10 while the combustion gases from the coke burner flow through the stove 9.

The design of the stoves may be of any suitable type, but normally metal cylinders packed with fire brick checker work is preferred as this type of construction is very simple and can be easily repaired. When the operation is changed from one stove to another there is a certain amount of combustion gas remaining in the stove which is carried through the kiln. This normally does no harm, but if desired the stove can be blown out with $SO_2$ gases by providing a suitable vent in the pipe 3.

The gas from the pipe 15 passes in series through the absorbing towers 29 and 30 where it flows in countercurrent to a stream of water pumped from the water tank 31 through the pipe 32 by means of the pump 33, make up water being introduced thru the valved pipe 14. Towers 29 and 30 may advantageously be packed or otherwise designed to permit adequate surface of contact between the gas and the water. The spent gas which contains only an infinitesimal trace of $SO_2$ passes out through the vent 34. The cold water absorbs the $SO_2$, forming a solution which leaves the tower 29 through the pipe 35 being collected in the $SO_2$ liquor tank 36. From this tank it is pumped through the pipe 37 by means of the pump 38 into two packed stripping towers 39 and 40 down which it flows in countercurrent to hot air which enters through the pipe 41 and leaves through the pipe 42.

When the $SO_2$ gas is to be used in the contact sulphuric acid process this hot air, which may be pre-heated from any suitable source is preferably adjusted in temperature so that it removes an amount of $SO_2$, resulting in a gas mixture containing from 7 to 9% of $SO_2$ and being suitable for the contact sulphur acid process, except for the fact that it contains considerable moisture. This gas is, therefore, normally passed through a drying tower 43 before flowing to the contact plant, not shown.

The stripped liquor which contains normally not over one-tenth of a percent of $SO_2$ may be returned to the water tank 31. It is then recirculated thru the absorbing towers with the addition of sufficient water to make up for the evaporation in the stripping towers and in the absorbing towers. The pumping of a dilute solution of $SO_2$ results in a slight loss of $SO_2$ through the vent 34 and where water is cheap, slightly better overall $SO_2$ economy is obtained by discarding the weak solution from the stripping towers and using fresh water only.

In the installation shown in Fig. 2 the same parts bear the same numerals. This figure shows a continuous heat exchanger 44 taking the place of the stoves 9 and 10, the heat exchanger being of the tubular type with tubes 45 and baffles 46. The gases from the pipe 8 flow through the tubes 45 over which flow the combustion gases from the coke burner through the valved pipe 47, a satisfactory contact with the tubes being provided by the baffles 46 which force the combustion gases to follow a sinuous path.

This figure also shows a modification of circulation in the stripper and absorber towers. Instead of recirculating dilute solution from the water tank 31 pure water is introduced into the absorbing tower through the valved pipe 48 and the dilute $SO_2$ solution from the tank 31 is pumped through the pipe 49 by means of the pump 50 into the bubble tower 5 where the hot kiln gases remove the $SO_2$ contained therein. As the amount of dilute $SO_2$ solution flowing from the tank 31 is normally greater than that evaporated in cooling down the gases in the bubble tower 5, some liquid may be continuously drawn off from the hottest part of the bubble tower. Because of the high temperature of the bottom of the bubble tower, where it contacts with the hot gases from the kiln, the water at this point is practically free from any dissolved $SO_2$.

The continuous heat exchanger shown in Fig. 2 presents numerous advantages from an operating standpoint. In the first place the heating is continuous and the temperature of the gases is therefore constant, whereas in the stoves the temperature is hotter at first and decreases as the stoves give up their heat. The efficiency of heat transfer is also somewhat higher because the stoves have to be heated up to a high temperature and in the later portions of the heating cycle the heat transfer from the hot gases to the hot fire brick is, of course, poor, whereas in the heat exchanger in Fig. 2 a continuous efficient heat exchange is maintained. These marked operating advantages which reduce the amount of fuel required and make for a considerably more regular and uniform temperature in the kiln are, however, obtained at the expense of simplicity of construction for the heat exchanger presents a considerable engineering problem because of the somewhat corrosive nature of the gases circulating through it. Also it is difficult to clean and requires rather careful operation to prevent plugging with sulphur or carbon because there is a tendency for the small amount of hydrocarbons present in the gas to react with the $SO_2$ in the heat exchanger forming sulphur. Likewise some carbon may be produced. With the uniform moderate temperature in the heat exchanger, the carbonization and sulphur formation is kept at a minimum and when properly operated does not cause serious trouble, but rather careful supervision is necessary. With the stoves a much less even heating is obtained and the tendency to form sulphur and carbon is much greater because, of course, the lower portions of the stove are heated to a much higher temperature than the upper portions, but the stoves do not readily plug up and can be very easily cleaned. Both methods, therefore, present advantages and the best heating method to be used is, of course, a compromise, determined by the conditions of a particular installation and the most satisfactory method will, of course, be adopted by the skilled chemical engineer.

The absorption and stripping method shown in Fig. 2 is more efficient than that shown in Fig. 1 because there is practically no loss of $SO_2$ through the vent 34. On the other hand there is a considerable consumption of water and this process, although more efficient from the standpoint of recovery of $SO_2$ or prevention of nuisance due to discharge of $SO_2$ into the atmosphere, may prove less economical where water is expensive. In such cases it is cheaper to throw away some $SO_2$ and to use the method of Fig. 1 which, of course, gives the maximum economy in the use of water. Both systems operate effectively and the choice will be determined by economic and operating factors. Both systems have been illustrated, one in one figure and one in the other, but it should be understood that there is no particular connection between the specific method of heating the circulating gases and the specific method of absorbing and stripping shown. Thus, for example, in one plant it may be more desirable to use the stripping and absorbing method of Fig. 1 with the continuous heat exchanger of Fig. 2 and vice versa.

While the invention has been illustrated specifically in the drawing in a form in which the circulating gases are practically free from oxygen (except, of course, when starting up when for the first circulation air may be used) it should be understood that the invention is not limited to complete recirculation. In some cases it may be desirable to introduce a small amount of air. This is particularly true where the amount of hydrocarbons present in the circulating gas is so small that they can safely be burned. In such cases the introduction of a small amount of air into the gases in pipe 8 will result in burning out the hydrocarbons, complete prevention of sulphur formation and considerable saving in fuel. The dilution resulting will not be excessive and will still be so low as to result in the production of a sulphur dioxide gas high enough for economical absorption and stripping. If the hydrocarbons are burned the gas take-off from the system may be located in pipe 3 instead of in pipe 7. In such a case a hydrocarbon free $SO_2$ is obtained and may be used after suitable dilution with air in a contact process directly or for any purpose for which a hydrocarbon free $SO_2$ is needed. The burning of hydrocarbons in the gas, however, requires very careful adjustment and supervision as the amount of hydrocarbons tends to vary and in many cases it is preferable to use the simple arrangement illustrated in the drawing. It is understood, however, that the invention is not limited thereto and includes processes in which the circulating gases are slightly diluted with combustion air.

What I claim is:

1. A method of producing a concentrated $SO_2$ gas from the acid sludge from the sulphuric acid purification of hydrocarbonaceous material which comprises maintaining an undiluted recirculating stream of $SO_2$ gas which passes successively through a heating stage, a sludge decomposition stage and a cooling stage, subjecting the sludge in the decomposition stage to direct contact with the hot $SO_2$ gas from the heating stage under conditions such that $SO_4$ components of the sludge are reduced to $SO_2$ and volatile hydrocarbons and water are distilled off, condensing the major portion of the water vapor and condensable hydrocarbons from the gas in the cooling stage, withdrawing a portion of the resulting concentrated $SO_2$ gas from the system and reheating the remainder in the heating stage by heat exchange with hot solids while out of contact with substantial amounts of diluting gases.

2. A method of producing a concentrated $SO_2$ gas from the acid sludge from the sulphuric acid purification of petroleum products which comprises maintaining an undiluted recirculating stream of $SO_2$ gas which passes successively through a heating stage, a sludge decomposition stage and a cooling stage, subjecting the sludge in the decomposition stage to direct contact with the hot $SO_2$ gas from the heating stage under conditions such that $SO_4$ components of the sludge are reduced to $SO_2$ and volatile hydrocarbons and water are distilled off, condensing the major portion of the water vapor and condensable hydrocarbons from the gas in the cooling stage, withdrawing a portion of the resulting concentrated $SO_2$ gas from the system and reheating the remainder in the heating stage by heat exchange with hot solids while out of contact with substantial amounts of diluting gases.

3. A method of producing a concentrated $SO_2$ gas from the acid sludge from the sulphuric acid purification of hydrocarbonaceous material which comprises maintaining an undiluted recirculating stream of $SO_2$ gas which passes successively through a heating stage, a sludge decomposition stage and a cooling stage, subjecting the sludge in the decomposition stage to direct contact with the hot $SO_2$ gas from the heating stage under conditions such that $SO_4$ components of the sludge are reduced to $SO_2$ and volatile hydrocarbons and water are distilled off, condensing the major portion of the water vapor and condensable hydrocarbons from the gas in the cooling stage, withdrawing a portion of the resulting concentrated $SO_2$ gas from the system and reheating the remainder in the heating stage by passing it in contact with hot refractory material while out of contact with substantial amounts of diluting gases.

4. A method according to claim 1 in which the $SO_2$ gas withdrawn from the system is passed in contact with an extended surface of cold water whereby the $SO_2$ is absorbed to form a solution of $SO_2$, the solution is removed from the zone of absorption, and a purified $SO_2$ gas is driven therefrom.

5. A method according to claim 1 in which the $SO_2$ gas withdrawn from the system is passed in contact with an extended surface of cold water to produce an aqueous solution of $SO_2$, this solution is removed from the zone of absorption, and hot air is blown through it under temperature conditions such that a 7-9% $SO_2$-air mixture is obtained.

6. A method of producing a concentrated $SO_2$ gas from the acid sludge from the sulphuric acid purification of hydrocarbonaceous material which comprises maintaining an undiluted recirculating stream of $SO_2$ gas which passes successively through a heating stage, a sludge decomposition stage and a cooling stage, subjecting the sludge in the decomposition stage to direct contact with the hot $SO_2$ gas from the heating stage under conditions such that $SO_4$ components of the sludge are reduced to $SO_2$ and volatile hydrocarbons and water are distilled off, condensing the major portion of the water vapor and condensable hydrocarbons from the gas in the cooling stage and reheating a portion of the resulting concentrated $SO_2$ gas in the heating stage by heat exchange with hot solids while out of contact with substantial amounts of diluting gases, withdrawing another portion of the concentrated $SO_2$ gas from the circuit and absorbing $SO_2$ therefrom in a solvent liquid, removing the resulting $SO_2$ solution from the zone of absorption and expelling a purified $SO_2$ gas therefrom, and returning the solvent liquid to the absorption zone.

7. A method according to claim 1 in which the temperature to which the $SO_2$ gas stream is heated is such that the sludge is not heated to temperatures at which $H_2S$ is formed.

8. A method according to claim 2 in which the temperature to which the $SO_2$ gas stream is heated is such that the sludge is not heated to temperatures at which $H_2S$ is formed.

9. A method according to claim 2 in which the $SO_2$ gases are caused to flow over the sludge while the latter is continuously moved countercurrent to the gases.

10. A method according to claim 2 in which the sludge is heated gradually in zones of increasing temperature, the first zone being at a temperature at which water and volatile hydrocarbons are distilled, the second zone at a temperature at which $SO_4$ compounds are rapidly reduced to $SO_2$ and a third zone at a temperature at which the residue is conditioned to form a useful fuel.

11. A method according to claim 1 in which the gas stream is heated in a continuous heat exchanger by means of combustion gases.

JAMES M. RUMPLE.